United States Patent Office 3,506,638
Patented Apr. 14, 1970

3,506,638
POLYMER MODIFICATION WITH A COMPLEX
OF ArN₂X AND RMX
Henry L. Hsieh, Bartlesville, Okla., assignor to Phillips
Petroleum Company, a corporation of Delaware
No Drawing. Filed Dec. 29, 1967, Ser. No. 694,389
Int. Cl. C08d 1/36, 5/02
U.S. Cl. 260—94.7                  5 Claims

ABSTRACT OF THE DISCLOSURE

The molecular weight of polymers of conjugated dienes is increased and the cold flow reduced by treating the polymers with a complex compound of an aryldiazonium halide and a Lewis acid of the group of halides and organic halogen compounds of boron, tin, phosphorus, arsenic, iron, lead, mercury, thallium, and antimony, the treating agent being added to terminate the polymerization, to the polymer solution following termination, or incorporated into the dry polymer.

BACKGROUND OF THE INVENTION

Various types of treating agents have been employed to reduce the cold flow of polymers. Reduction in cold flow is not necessarily accompanied by an increase in Mooney of the polymer. Frequently the treating agents include compounds that require special handling as they are sensitive to atmospheric components such as oxygen, carbon dioxide, moisture, and the like. Acidic-type halides, also referred to as Lewis acids, are representative of such materials. Accordingly, it would be desirable in the art to have a process for modifying such polymers utilizing nonsensitive treating agents.

THE INVENTION

The present invention is concerned with a method for increasing the molecular weight of a polymer of a conjugated diene such as polybutadiene, as evidenced by an increase in Mooney and inherent viscosity, and also reducing cold flow. To accomplish these results, the polymer is treated with a complex compound of an aryldiazonium halide and a Lewis acid.

It is thus an object of this present invention to provide a method for the increasing of molecular weight of polymers of conjugated dienes.

Another object of this invention is to provide a method for reducing cold flow of polymers of conjugated dienes.

A further object of the present invention is to provide a method for the treatment of polymers of conjugated dienes which utilize a nonsensitive treating agent.

Other objects, aspects and the several advantages of the invention will be readily apparent to those skilled in the art from the detailed description and the appended claims.

In accordance with the present invention, increase in the molecular weight and reduction in cold flow of polymers of conjugated dienes containing from 4 to 12 carbon atoms is obtained by treating the polymer with a complex compound of an aryldiazonium halide and a Lewis acid. In one embodiment the treating agent is employed as a shortstopping or terminating agent for the polymerization. The shortstopping agents are applicable broadly to polymerization processes in which the diene such as butadiene, is polymerized with organometal-type catalysts.

In another embodiment, the complex compound is added to the polymerization mixture obtained by polymerizing the diene in the presence of a catalyst system which includes an organometal compound and iodine, present either in the free or combined state. This type of polymerization system, which is described in U.S. 3,205,215, produces, for example, cis-polybutadiene which has many outstanding properties in the cured state but has a tendency to cold flow in the unvulcanized state. As hereinbefore stated, the invention is also applicable to treating a dry polymer or a solution of the polymer after inactivation of the catalyst.

The treating agents of this invention are stable complex compounds formed from (1) an aryldiazonium halide of the formula ArN₂X, wherein Ar is an aryl radical of the group consisting of phenyl, 1-naphthyl, and 2-naphthyl and the alkyl, halo, carbalkoxy and alkoxy derivatives thereof containing up to 20 carbons and X is a halogen, and (2) a halide of the formula $R_aMX_b$, wherein R is an alkyl, cycloalkyl, or aryl radical or combination thereof containing from 1 to 20 carbon atoms, M is boron, tin, phosphorus, arsenic, iron, lead, mercury, thallium, or antimony, X is a halogen, $a$ is an integer from 0 to 3, $b$ is an integer from 2 to 5, and $a+b$ equals the valence of M. The main advantage in the use of these complex compounds is that they can be handled in air with no loss in activity.

Illustrative of the halides from which the complex compounds are prepared are the following: boron trifluoride, boron tribromide, stannic chloride, lead tetrachloride, ferric chloride, mercuric chloride, thallic chloride, stannic iodide, phosphorus tribromide, phosphorus pentachloride, phosphorus trifluoride, arsenic tribromide, arsenic pentofluoride, arsenic pentachloride, antimony trifluoride, antimony trichloride, antimony triiodide, dichloromethylborane, difluoro-n-butylborane, trichloromethyltin, difluorodibenzyltin, dichlorophenylarsine, diiodophenylstibine, di-n-propylarsonium tribromide, (4-toly)(4-methoxyphenyl)stibonium trichloride, bis(4 - tolyl) - stibonium triiodide, difluorophenylphosphine, and tribromodiethylphosphorane.

The treating agent is generally added in an amount ranging from 0.5 to 10, preferably from 1 to 6, gram millimoles per 100 grams of polymer. The treating agent can be added per se, but when a polymer solution is being treated, it is generally preferred to charge it as a solution or suspension in a hydrocarbon.

The treating time will generally depend upon the temperature and is generally in the range of 30 seconds to 10 hours. In many instances one to two hours will give a product with zero cold flow and a pronounced increase in Mooney. A suitable temperature for treating the polymer is in the range of 30 to 250° F.

The following specific examples illustrate the present invention.

Example I

A series of runs was conducted to demonstrate the effect of benzenediazonium fluoride-phosphorus pentafluoride complex (also designated as Phosfluorogen A, a product of Ozark Mahoning Company, Tulsa, Okla.) as a terminating agent on the molecular weight of polybutadiene prepared in the presence of a catalyst formed on mixing triisobutylaluminum, titanium tetrachloride, and iodine. The polymerization recipe was as follows:

| | |
|---|---:|
| 1,3-butadiene, parts by weight | 100 |
| Toluene, parts by weight | 1100 |
| Triisobutylaluminum, mhm.[1] | 2.4 |
| Iodine, mhm.[1] | 0.71 |
| Titanium tetrachloride, mhm.[1] | 0.41 |
| Temperature °F. | 41 |
| Time, hours | 16 |

[1] Mhm—gram millimoles per 100 grams monomer.

In conducting the runs, toluene was charged first to the reactor after which it was purged with nitrogen. Butadiene was then added followed by the triisobutylaluminum and elemental iodine. The temperature was adjusted to 41° F. and titanium tetrachloride was introduced. Two runs according to the invention were terminated with different amounts of the benzenediazonium fluoride-phosphorus pentafluoride complex. A control run was terminated with isopropyl alcohol, the amount added being sufficient to inactivate the catalyst as evidenced by disappearance of the color. The reaction mixtures were maintained at 122° F. for two hours, after which the polymers were coagulated in isopropyl alcohol. One part by weight per 100 parts by weight rubber of the antioxidant, 2,2'-methylene-bis(4-methyl-6-tert-butylphenol), was added to each polymer during the coagulation step. The products were separated and dried. Results were as follows:

| | 1 (control) | 2 | 3 |
|---|---|---|---|
| | Terminating agent, type | | |
| | Isopropyl alcohol | Phosfluorogen A | Phosfluorogen A |
| Terminating agent, phr. | Excess | [1] 0.5 | [2] 1.0 |
| ML-4 at 212° F. | 40 | 50 | 61 |
| Cold flow, mg./min. | 2.36 | 0.76 | 0 |
| Inherent viscosity | 2.32 | 2.53 | 2.85 |
| Gel, percent | 0 | 0 | 0 |
| Unsaturation, percent | 94.6 | ([3]) | 94.1 |
| Microstructure, percent: | | | |
| cis | 91.9 | ([3]) | 92.2 |
| trans | 3.8 | ([3]) | 3.7 |
| Vinyl | 4.3 | ([3]) | 4.1 |

[1] Two gram millimoles.
[2] Four gram millimoles.
[3] Not determined.

These data show that a substantial increase in Mooney and inherent viscosity, and a reduction in cold flow, occurred in the runs terminated with the benzenediazonium fluoride-phosphorus pentafluoride complex. The polymers were gel free and there was no significant effect on unsaturation and microstructure.

Example II

Three runs were made according to the recipe of Example I. One run, used as a control, was terminated with isopropyl alcohol as described therein with the temperature maintained at 122° F. for two hours. In each of the other runs one phr. of benzenediazonium fluoride-phosphorus pentafluoride terminating agent was added. One polymerization mixture was coagulated immediately after addition of the terminating agent and the other was maintained at 122° F. for one hour prior to coagulation. Results were as follows:

| Termination | ML-4 at 212° F. | Cold flow, mg./min. |
|---|---|---|
| (1) Isopropyl alcohol, heated 2 hours at 122° F. | 43 | 1.93 |
| (2) Phosfluorogen A, coagulated immediately | 46 | 0.65 |
| (3) Phosfluorogen A, heated 1 hour at 122° F. | 52 | 0.14 |

These data show that prolonged treatment with the terminating agent of the invention was not essential to obtain a pronounced reduction in cold flow.

Example III

A series of runs were made using the polymerization recipe of Example I but substituting $PCl_5$ for the benzenediazonium fluoride complex as the terminating agent.
The polymerization recipe was as follows:

| | |
|---|---:|
| 1,3-butadiene, parts by weight | 100 |
| Toluene, parts by weight | 1100 |
| Triisobutylaluminum, mhm. | 2.4 |
| Iodine, mhm. | 0.71 |
| Titanium tetrachloride, mhm. | 0.41 |
| Temperature, °F. | 41 |
| Time, hours | 17 |

Three runs according to the invention were terminated with different amounts of $PCl_5$. A control run was terminated with isopropyl alcohol and worked up immediately. Following are the data:

| | 1 | 2 | 3 | 4 (control) |
|---|---|---|---|---|
| $PCl_5$ added, phr. | 0.5 | 1 | 2 | 0 |
| $PCl_5$ added, mmoles | 2.4 | 4.8 | 9.6 | 0 |
| Time at 122° F. after addition of terminating agent | 2 | 2 | 2 | 0 |
| Inherent viscosity | 1.47 | 1.50 | 0.44 | 2.39 |
| Gel, wt., percent | 93 | 94 | 95 | 0 |
| Cold flow, mg./min. | ([1]) | ([1]) | ([1]) | 4.5 |

[1] Gel was formed before mixture was heated. Cold flow not determined

A comparison of these data with those of Example I above reveals that benzenediazonium fluoride-phosphorus pentafluoride complex (Phosfluorogen A) has a different effect from that of $PCl_5$. Phosfluorogen A reduced cold flow without the formation of gel.

Example IV

Two runs were made using the polymerization recipe of Example I. In the first of these runs, isopropyl alcohol was added shortly after $PCl_5$ was introduced. This run can be compared with Run 2 of Example II but it should be noted that 2 phr. of $PCl_5$ was used instead of 1 phr. of Phosfluorogen A. Run 2 was terminated with alcohol first and then $PCl_5$ was added. The following results were obtained:

| | Run 1 | Run 2 |
|---|---|---|
| $PCl_5$ added, phr. | 2 | 1 |
| Inherent viscosity | 2.30 | 2.12 |
| Gel, wt., percent | 0 | 0 |
| ML-4 at 212° F. | 40 | 42 |
| Cold flow, mg./min. | 2.2 | 4.2 |

These data demonstrate that the results with $PCl_5$ are different from those with Phosfluorogen A. The Mooney value (ML-4 at 212° F.) of control Run 4 of Example III was 43. There was a slight decrease in Mooney in the runs with $PCl_5$. A significant Mooney increase occurred when Phosfluorogen A was added following termination with isopropyl alcohol.

Reasonable variations and modifications of this invention can be made or followed, in view of the foregoing, without departing from the spirit or scope thereof.

I claim:
1. A process for the treatment of a polymer of a conjugated diene having from 4 to 8 carbon atoms which comprises treating said polymer at a temperature in the range of 50 to 250° F. for a period of time in the range of 30 seconds to 10 hours with from 0.5 to 10 millimoles per 100 grams of polymer of an agent consisting of the complex formed from (1) an aryldiazonium halide of the formula $ArN_2X$, wherein Ar is an aryl radical of the group consisting of phenyl, 1-naphthyl, and 2-naphthyl, and the alkyl, halo, carbalkoxy and alkoxy derivatives thereof containing up to 20 carbon atoms and X is a halogen and (2) a halide of the formula $R_aMX_b$, wherein R is an alkyl, cycloalkyl or aryl radical or combinations thereof containing from 1 to 20 carbon atoms, M is boron, tin, phosphorus, arsenic, lead, iron, thallium, mercury, or antimony, X is a halogen, $a$ is an integer from 0 to 3, $b$ is an integer from 2 to 5, and $a+b$ equals the valence of M.

2. A process according to claim 1 wherein said polymer is polybutadiene and said agent is benzenediazonium fluoride-phosphorus pentafluoride complex.

3. A process according to claim 2 wherein said treating agent is employed as a terminating agent for the polymerization of said polymer.

4. A process according to claim 2 wherein said treating agent is added to a solution of said polymer.

5. A process according to claim 2 wherein said treating agent is added to said polymer which is dry.

References Cited

UNITED STATES PATENTS 3,328,376   6/1967   Bernemann et al. ____ 260—94.3

FOREIGN PATENTS 992,210   5/1965   Great Britain.
1,032,534   6/1966   Great Britain.

OTHER REFERENCES

"Molecular Weight Jump Reaction" by Engel, Schafer, Kiepert, Rubber Age, December 1964, pp. 410–415.

JOSEPH L. SCHOFER, Primary Examiner

W. HAMROCK, Assistant Examiner

U.S. Cl. X.R.

260—83.3, 85.1, 94.2, 94.3, 94.6, 96